US012272285B1

(12) United States Patent
Zhu et al.

(10) Patent No.: US 12,272,285 B1
(45) Date of Patent: Apr. 8, 2025

(54) DISPLAY PANEL, CONTROL METHOD OF DISPLAY PANEL AND DISPLAY DEVICE

(71) Applicant: Xiamen Tianma Micro-Electronics Co., Ltd., Xiamen (CN)

(72) Inventors: Renliang Zhu, Xiamen (CN); Jinliang Huang, Xiamen (CN); Yiqiang Lin, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/632,117

(22) Filed: Apr. 10, 2024

(30) Foreign Application Priority Data

Jan. 29, 2024 (CN) ......................... 202410123675.9

(51) Int. Cl.
*G09G 3/20* (2006.01)

(52) U.S. Cl.
CPC ....... *G09G 3/20* (2013.01); *G09G 2310/0202* (2013.01); *G09G 2310/0264* (2013.01); *G09G 2320/02* (2013.01)

(58) Field of Classification Search
CPC ............. G09G 3/20; G09G 2310/0202; G09G 2310/0264; G09G 2320/02
See application file for complete search history.

(56) References Cited

U.S. PATENT DOCUMENTS

| | | | | |
|---|---|---|---|---|
| 2017/0192593 | A1* | 7/2017 | Cho | G06F 3/04164 |
| 2017/0193923 | A1* | 7/2017 | Park | G09G 3/3258 |
| 2017/0193961 | A1* | 7/2017 | Wang | G11C 19/184 |
| 2017/0193963 | A1* | 7/2017 | Pan | G09G 3/3648 |
| 2017/0196076 | A1* | 7/2017 | Chen | H05K 1/028 |
| 2019/0361658 | A1* | 11/2019 | Shi | G06F 3/013 |
| 2019/0366031 | A1* | 12/2019 | Travers | G09G 3/20 |
| 2019/0385500 | A1* | 12/2019 | Gao | G01R 31/40 |

FOREIGN PATENT DOCUMENTS

| | | |
|---|---|---|
| CN | 107633813 B | 8/2019 |
| CN | 115729004 A | 3/2023 |

* cited by examiner

*Primary Examiner* — Sejoon Ahn
(74) *Attorney, Agent, or Firm* — Anova Law Group, PLLC

(57) ABSTRACT

A display panel, a control method of a display panel and a display device are provided. The display panel includes a display area, a non-display area including source connection lines, clock control signal lines, active signal lines, first soldering pads, second soldering pads, a control circuit electrically connected to and configured to control two driver chips to not output active signals to the correspondingly connected active signal lines at the same time, and not to output driving signals to the correspondingly connected clock control signal lines at the same time. At least one first target soldering pad and a second target soldering pad are connected to the same driver chip. The minimum distance between the first target soldering pad and the second target soldering pad is greater than half of the length of the driver chip in the second direction.

12 Claims, 9 Drawing Sheets

DISPLAY PANEL, CONTROL METHOD OF DISPLAY PANEL AND DISPLAY DEVICE

CROSS-REFERENCE TO RELATED APPLICATION

This application claims the priority of Chinese Patent Application No. 202410123675.9, filed on Jan. 29, 2024, the content of which is incorporated by reference in its entirety.

TECHNICAL FIELD

The present disclosure generally relates to the field of display technologies and, more particularly, relates to a display panel, a control method of a display panel and a display device.

BACKGROUND

In a display panel, after the data signal is written into the data line, the multiplexer is turned off through the clock control signal, and the potential is maintained by the capacitor on the data line. When the data signal is written normally, the data line is in a suspended state. However, due to the influence of parasitic coupling capacitance, if the clock control signal jumps, it will inevitably affect the value of the data signal on the source connection line, which will then affect the data potential signal written to the data line, causing display abnormalities.

To solve the above technical problems, a shielded signal line is provided between the source connection line and the clock control signal line, and the shielded signal line is connected to a constant potential signal to shield the clock control signal line of the jumping AC signal. The coupling effect of the signal on the adjacent source connection lines is avoided, thereby avoiding the potential increase of the source connection lines caused by the coupling effect.

However, in a display panel provided with the shielded signal lines, vertical white lines are likely to appear on the screen position corresponding to the edge-most source connection lines, resulting in reduced display quality. The present disclosed display panels, methods for controlling the display panels and display devices are direct to solve one or more problems set forth above and other problems in the arts.

SUMMARY

One aspect of the present disclosure provides a display panel. The display panel includes a display area; a non-display area at least partially surrounding the display area; and a control circuit, or a plurality of first soldering pads and a plurality of second soldering pads. The display area includes a plurality of data lines extending in a first direction; the non-display area includes a plurality of source connection lines, a plurality of clock control signal lines, a plurality of active signal lines, a bonding area and a multiplexer located between the display area and the bonding area, the multiplexer is electrically connected to a first end of a source level connection line of the plurality of source connection lines and a first end of a clock control signal line of the plurality of clock control signal lines respectively, the bonding area includes two driver chips arranged oppositely in the first direction, each of the two driver chips is electrically connected to second ends of the plurality of source connection lines and second ends of the plurality of clock control signal lines, and the plurality of active signal lines are distributed between the plurality of the source connection lines and the plurality of the clock control signal lines; the control circuit is electrically connected to the two driver chips, and configured to control the two driver chips not to output active signals to correspondingly connected active signal lines of the plurality of active signal lines at the same time and not to output driving signals to correspondingly connected clock control signal lines of the plurality of clock control signal lines, and each of the two driver chips is electrically connected to at least one of the plurality of active signal lines; and the plurality of first soldering pads and the plurality of second soldering pads are distributed in the bonding area, one end of each active signal line of the plurality of active signal lines is connected to a different first soldering pad of the plurality of first soldering pads, each of two driver chips is electrically connected to at least one of the plurality of first soldering pads, each of the plurality of clock control signal lines is electrically connected to the driver chip through a different second soldering pad of the plurality of second soldering pads, and the first soldering pad meets one of the following conditions: at least one first target soldering pad among the plurality of first soldering pads and a second target soldering pad among the plurality of second soldering pads are connected to a same driver chip of the two driver chips, a minimum distance between the second target soldering pad and the first target soldering pad is greater than a target size, the target size is half a length of the driver chip in the second direction, the second direction is perpendicular to the first direction, and when a number of the plurality of first pads is two, the display panel further includes a first driving circuit and a second driving circuit electrically connected to different first soldering pads of the plurality of first soldering pads.

Another aspect of the present disclosure provides a method for controlling a display panel. The method may include providing a display panel. The display panel includes a display area; a non-display area at least partially surrounding the display area; and a control circuit, or a plurality of first soldering pads and a plurality of second soldering pads. The display area includes a plurality of data lines extending in a first direction; the non-display area includes a plurality of source connection lines, a plurality of clock control signal lines, a plurality of active signal lines, a bonding area and a multiplexer located between the display area and the bonding area, the multiplexer is electrically connected to a first end of a source level connection line of the plurality of source connection lines and a first end of a clock control signal line of the plurality of clock control signal lines respectively, the bonding area includes two driver chips arranged oppositely in the first direction, each of the two driver chips is electrically connected to second ends of the plurality of source connection lines and second ends of the plurality of clock control signal lines, and the plurality of active signal lines are distributed between the plurality of the source connection lines and the plurality of the clock control signal lines; the control circuit is electrically connected to the two driver chips, and configured to control the two driver chips not to output active signals to correspondingly connected active signal lines of the plurality of active signal lines at the same time and not to output driving signals to correspondingly connected clock control signal lines of the plurality of clock control signal lines, and each of the two driver chips is electrically connected to at least one of the plurality of active signal lines; and the plurality of first soldering pads and the plurality of second soldering pads are distributed in the bonding area, one end of each active signal line of the plurality of active signal lines is connected to a different first soldering pad of the plurality of first soldering pads, each of two driver chips is electrically connected to at least one of the plurality of first soldering pads, each of the plurality of clock control signal lines is electrically connected to the driver chip through a different second soldering pad of the plurality of second soldering pads, and the first soldering pad meets one of the following conditions: at least one first target soldering pad among the plurality of first soldering pads and a second target soldering pad among the plurality of second soldering pads are connected to a same driver chip of the two driver chips, a minimum distance between the second target soldering pad and the first target soldering pad is greater than a target size, the target size is half a length of the driver chip in the second direction, the second direction is perpendicular to the first direction, and when a number of the plurality of first pads is two, the display panel further includes a first driving circuit and a second driving circuit electrically connected to different first soldering pads of the plurality of first soldering pads. The method also includes, when the display panel includes the control circuit, sending a first trigger signal to the control circuit to control the two driver chips in the display panel not to send output active signals to the corresponding connected active control signal lines at the same time and not to output driving signals to the correspondingly connected clock control signal lines. Both ends of the active signal line are electrically connected to different driver chips respectively. Further, the method includes, when the display panel includes the first bonding pad and the second bonding pad, or when the display panel includes the first bonding pad, a first driving circuit and a second driving circuit, sending a second trigger signal to the two driver chips such that at least one of the two driver chips outputs an active signal to the correspondingly connected active signal line, and the two driver chips simultaneously output a driving signal to the correspondingly connected clock control signal line.

Another aspect of the present disclosure includes providing a display device. The display device includes a display panel. The display panel includes a display area; a non-display area at least partially surrounding the display area; and a control circuit, or a plurality of first soldering pads and a plurality of second soldering pads. The display area includes a plurality of data lines extending in a first direction; the non-display area includes a plurality of source connection lines, a plurality of clock control signal lines, a plurality of active signal lines, a bonding area and a multiplexer located between the display area and the bonding area, the multiplexer is electrically connected to a first end of a source level connection line of the plurality of source connection lines and a first end of a clock control signal line of the plurality of clock control signal lines respectively, the bonding area includes two driver chips arranged oppositely in the first direction, each of the two driver chips is electrically connected to second ends of the plurality of source connection lines and second ends of the plurality of clock control signal lines, and the plurality of active signal lines are distributed between the plurality of the source connection lines and the plurality of the clock control signal lines; the control circuit is electrically connected to the two driver chips, and configured to control the two driver chips not to output active signals to correspondingly connected active signal lines of the plurality of active signal lines at the same time and not to output driving signals to correspondingly connected clock control signal lines of the plurality of clock control signal lines, and each of the two driver chips is electrically connected to at least one of the plurality of active signal lines; and the plurality of first soldering pads and the plurality of second soldering pads are distributed in the bonding area, one end of each active signal line of the plurality of active signal lines is connected to a different first soldering pad of the plurality of first soldering pads, each of two driver chips is electrically connected to at least one of the plurality of first soldering pads, each of the plurality of clock control signal lines is electrically connected to the driver chip through a different second soldering pad of the plurality of second soldering pads, and the first soldering pad meets one of the following conditions: at least one first target soldering pad among the plurality of first soldering pads and a second target soldering pad among the plurality of second soldering pads are connected to a same driver chip of the two driver chips, a minimum distance between the second target soldering pad and the first target soldering pad is greater than a target size, the target size is half a length of the driver chip in the second direction, the second direction is perpendicular to the first direction, and when a number of the plurality of first pads is two, the display panel further includes a first driving circuit and a second driving circuit electrically connected to different first soldering pads of the plurality of first soldering pads.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

It should be noted that, as long as there is no conflict, the embodiments and features in the embodiments of this disclosure can be combined with each other. The present disclosure will be described in detail below with reference to the accompanying drawings and embodiments.

To enable those in the technical field to better understand the solutions of the present disclosure, the technical solutions in the embodiments of the present disclosure will be clearly and completely described below in conjunction with the accompanying drawings in the embodiments of the present disclosure. Obviously, the described embodiments are only parts of the embodiments of this disclosure, not all of them. Based on the embodiments in this disclosure, all other embodiments obtained by those of ordinary skill in the art without creative efforts should fall within the scope of protection of this disclosure.

It should be noted that the terms “first”, or “second”, etc. in the description and claims of this disclosure and the above-mentioned drawings are used to distinguish similar objects and are not necessarily used to describe a specific order or sequence. It should be understood that data so used may be interchanged where appropriate for the embodiments of the disclosure described herein. In addition, the terms “including” and “having” and any variations thereof are intended to cover non-exclusive inclusions, e.g., a process, method, system, product, or apparatus that encompasses a series of steps or units and need not be limited to those explicitly listed. Those steps or elements may instead include other steps or elements not expressly listed or inherent to the process, method, product or apparatus.

To solve the problem mentioned in the background that vertical white lines are easily generated at the screen position corresponding to the edge-most source connection line in the display panel, resulting in reduced display quality, embodiments of the present disclosure provide a display panel, a control method of a display panel and a display device.

Figure 1:
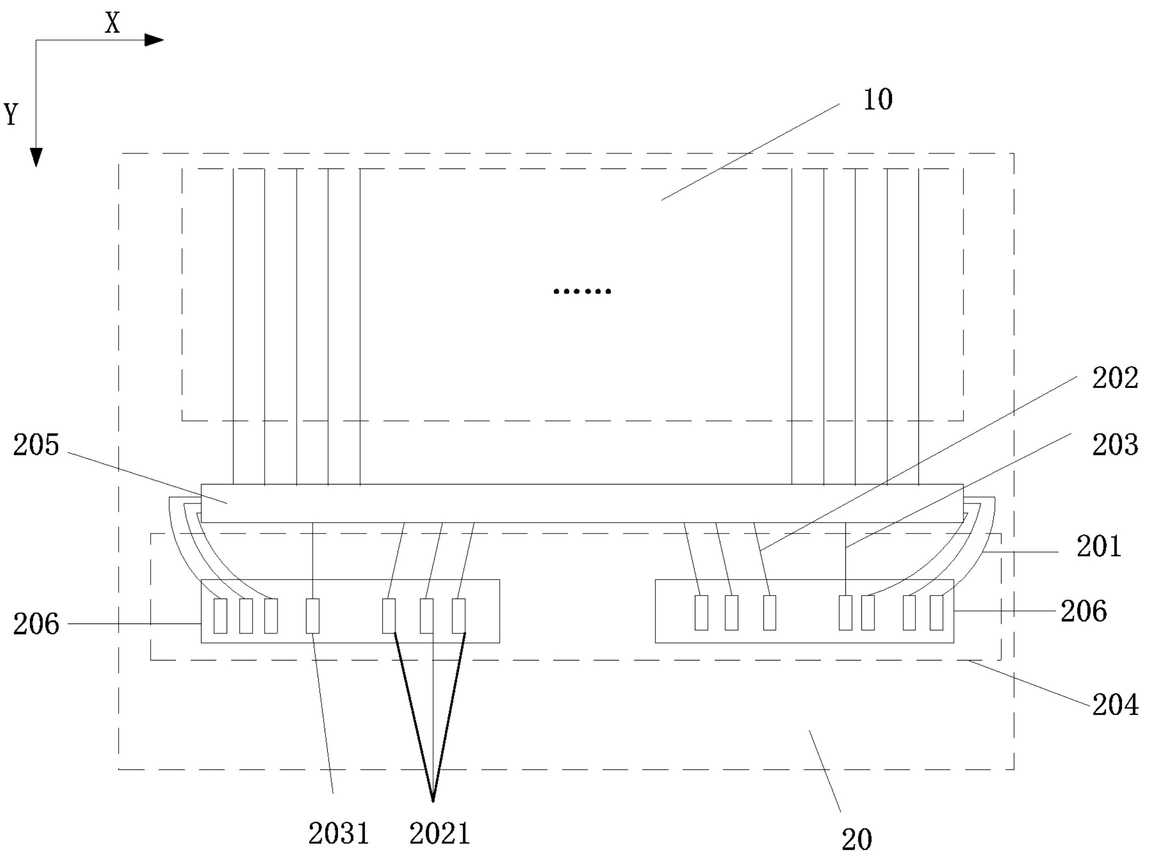
FIG. 1 illustrates a partial top view of an exemplary display panel according to various disclosed embodiments of the present disclosure.
Figure 2:
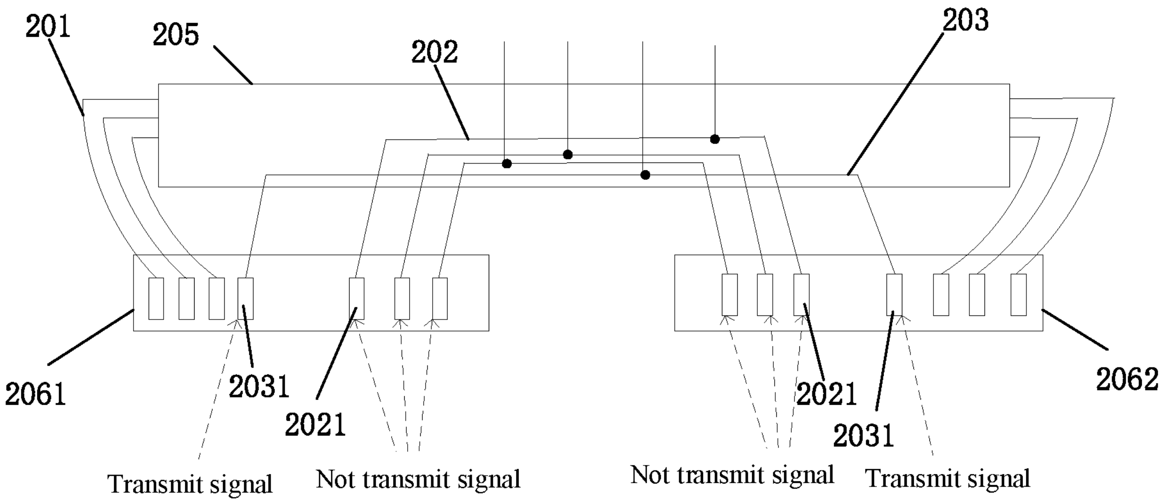
FIG. 2 illustrates a partial top view of a non-display area of an exemplary display panel according to various disclosed embodiments of the present disclosure.
Figure 3:
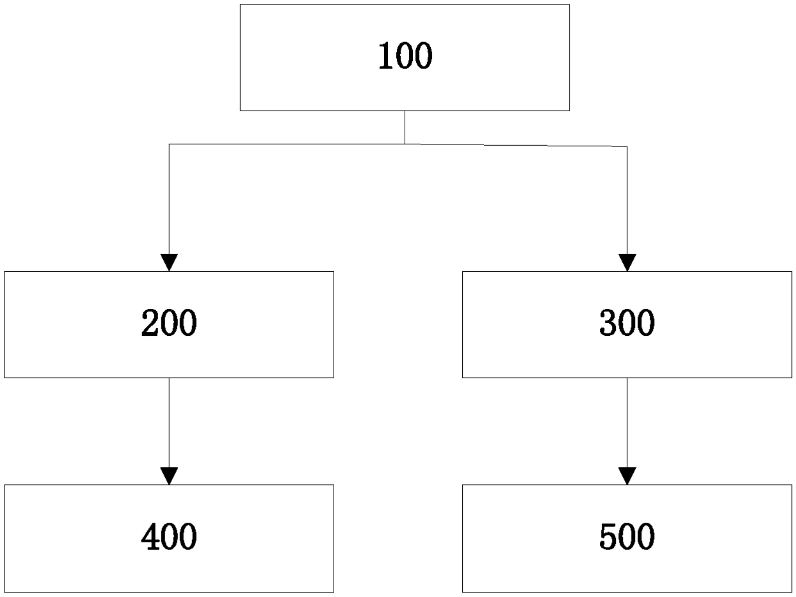
FIG. 3 illustrates a connection relationship between a control circuit and a driving chip of an exemplary display panel according to various disclosed embodiments of the present disclosure.

The present disclosure provides a display panel. FIGS. 1-3 illustrate an exemplary display panel according to various disclosed embodiments of the present disclosure. As shown in FIGS. 1-3, the display panel may include a display area 10 and a non-display area 20. The non-display area 20 may at least partially surround the display area 10.

The display area 10 may include a plurality of data lines extending in a first direction Y. The non-display area 20 may include a plurality of source connection lines 201, a plurality of clock control signal lines 202, a plurality of active signal lines 203, a bonding area 204 and a multiplexer 205. The multiplexer 205 may be located between the display area 10 and the bonding area 204. The multiplexer 205 may be electrically connected to a first end of the source connection line 201 and a first end of the clock control signal line 202, respectively. The bonding area 204 may include two driver chips 206 oppositely disposed in the first direction Y. Each driver chip 206 may be electrically connected to the second ends of the plurality of source connection lines 201 and the second ends of the plurality of clock control signal lines 202 respectively. The active signal lines 203 may be distributed between the plurality of source connection lines 201 and the plurality of clock control signal lines 202.

The display panel may also include a control circuit. The control circuit may be electrically connected to the two driver chips 206 and may be configured to control the two driver chips 206 not to output active signals to the correspondingly connected active signal lines 203 at the same time and not to output driving signals to the correspondingly connected clock control signal lines 202 at the same time. As shown in FIG. 2, each driving chip 206 may be electrically connected to at least one active signal line 203.

Referring to FIGS. 1-3, the display panel may send a first trigger signal to the control circuit such that the two driver chips 206 in the display panel may not output active signals to the correspondingly connected active signal lines 203 at the same time, and may not simultaneously output driving signals to the correspondingly connected control signal lines 202. By utilizing the two driver chips 206 to output the control signals in an interleaved manner, the coupling capacitance inside the two driver chips 206 may be eliminated, the phenomenon of vertical white lines generated on the screen position corresponding to the edge-most source connection line 201 may be prevented, and the display quality may be improved.

The above may be the first core idea of the present disclosure. The technical solutions in the embodiments of the present disclosure will be clearly and completely described below in conjunction with the drawings in the embodiments of the present disclosure. Based on the embodiments in this disclosure, all other embodiments obtained by those of ordinary skill in the art without creative efforts may fall within the scope of protection of this disclosure.

FIG. 1 shows a schematic structural diagram of a top view of an exemplary display panel according to various disclosed embodiments of the present disclosure. As shown in FIG. 1, the display panel may include a display area 10 and a non-display area 20. The display area 10 may include a plurality of data lines extending in the first direction Y and may be surrounded by the non-display area 20. The non-display area 20 may include a plurality of source connection lines 201, a plurality of clock control signal lines 202, a plurality of active signal lines 203, a bonding area 204 and a multiplexer 205. The active signal lines 203 may be distributed among the plurality of source connection lines 201 and the plurality of clock control signal lines 202. The multiplexer 205 may be disposed between the display area 10 and the bonding area 204. Two driver chips 206 opposite to each other in the first direction Y may be disposed in the bonding area 204, and may be connected to the first end of the source connection line 201 and the first end of the clock control signal line 202 respectively through the multiplexer 205. Each driver chip 206 may be electrically connected to the second end of the source connection line 201 and the second end of the clock control signal line 202 respectively. The display panel may also include a control circuit. The control circuit may be electrically connected to the two driver chips 206 to control the two driver chips 206 not to output active signals to the active signal lines 203 at the same time and not to output driving signals to the clock control signal lines 202 at the same time.

FIG. 2 is a partial top view of the non-display area of the display panel of FIG. 1. As shown in FIG. 2, each driver chip (the first driver chip 2061 and the second driver chip 2062) may be electrically connected to at least one active signal line 203. The driver chip may provide a constant potential signal to the active signal line 203 such that the active signal line 203 may not be affected by the jumping AC signal generated by the clock control signal line 202. Thus the signal interference may be reduced. By utilizing the above-mentioned first driver chip 2061 and the second driver chip 2062 to output control signals in the interleaved manner, the coupling capacitance inside the first driver chip 2061 and the second driver chip 2062 may be eliminated, thus the phenomenon of vertical white lines generated at the screen position corresponding to the edge-most source connection line 201 may be avoided, and the display quality may be improved.

In the above embodiment, as shown in FIG. 1, the multiplexer 205 may be a demultiplexer (Demux), and the number of active signal lines 203 may be reduced through the setting of the multiplexer 205 such that the width of the non-display area 20 in the first direction Y may be reduced as a whole, which may be conducive to realizing a narrow frame design. This disclosure does not specifically limit the type selection of the multiplexer.

In one embodiment of the present disclosure, as shown in FIG. 3, the display panel may include a control circuit. The control circuit may include a transmission module 100 for alternately sending a first control signal and a second control signal. The two driver chips may be respectively the first driver chip and the second driver chip.

The first driver chip may include a first receiving module 200 and a first driving module 400. The first receiving module 200 may be electrically connected to the transmission module 100. The first driving module 400 may be electrically connected to the first receiving module 200, a clock control signal line and an active signal line, and may be configured to output an active signal to the corresponding connected active signal line when the first receiving module 200 receives the first control signal, and output the driving signal to the corresponding connected clock control signal line when the first receiving module 200 receives the second control signal.

The second driver chip may include a second receiving module 300 and a second driving module 500. The second receiving module 300 may be electrically connected to the transmission module 100. The second driving module 500 may be electrically connected to the second receiving module 300, the clock control signal line and the active signal respectively, and may be configured to output a driving signal to the correspondingly connected clock control signal line when the second receiving module 300 receives the first control signal and output driving signal to the correspondingly connected clock control signal lines when the second receiving module 300 receives the second control signal.

In the above embodiment, as shown in FIG. 3, the first driver chip may include the first receiving module 200 and the first driving module 400, and the second driver chip may include the second receiving module 300 and the second driving module 500. The first control signal and the second control signal may be alternately sent to the first driver chip and the second driver chip through the transmission module 100 in the control circuit. When the first receiving module 200 receives the first control signal, it may send the active signal to the correspondingly connected active signal line. When the first receiving module 200 receives the second control signal, it may output a driving signal to the correspondingly connected clock control signal line. When the second receiving module 300 receives the first control signal, it may output a driving signal to the correspondingly connected clock control signal line. When the second receiving module 300 receives the second control signal, it may output an active signal to the correspondingly connected active signal line. Thus, by alternatively sending the signals to the first driver chip and the second driver chip through the transmission module, the coupling capacitance inside the first driver chip and the second driver chip may be eliminated, the phenomenon of vertical white lines easily occurring at the screen position corresponding to the edge-most source connection line 201 may be reduced, and the display quality may be improved.

The present disclosure also provides a control method of the display panel. The display panel may include a control circuit, two driver chips, a plurality of clock control signal lines and active signal lines. The control method may include:

Step S101: sending a first trigger signal to the control circuit such that the control circuit may control the two driver chips in the display panel to perform the following operations: not outputting active signals to the correspondingly connected active signal lines at the same time, and not simultaneously outputting driving signals to the correspondingly connected clock control signal lines. Two ends of the active signal line may be electrically connected to different driver chips respectively. By utilizing the two driver chips to alternatively output control signals, the coupling capacitance inside the two driver chips may be eliminated.

Specifically, the display panel in the present disclosure may include a control circuit. The control circuit may be electrically connected to the two driver chips and may be configured to control the two driver chips to perform the following operations: not outputting active signals to the correspondingly connected active signal lines at the same time, and not outputting driving signals to correspondingly connected clock control signal lines at the same time. Both ends of the active signal line are electrically connected to different driver chips respectively, and through alternatively outputting the control signals by the two driver chips, the coupling capacitance inside two driver chips may be eliminated.

In the above step S101, as shown in FIG. 1, under the configuration that the display panel may include a plurality of first soldering pads 2031 and a plurality of second soldering pads 2021, a second trigger signal may be sent to the two driver chips. The control circuit may control the two driver chips in the display panel not to output active signals to the correspondingly connected active signal lines at the same time, and not to output driving signals to the correspondingly connected clock control signal lines at the same time.

Specifically, as shown in FIG. 2, the two driver chips may be the first driver chip 2061 and the second driver chip 2062, respectively. The control circuit may control the first driver chip 2061 to send a signal to the first soldering pad 2031 and not to send a signal to the second soldering pad 2021. At the same time, the control circuit may control the second driver chip 2062 not to send signals to the first soldering pad 2031 and but send signals to the second soldering pad 2021. Accordingly, by controlling the two driver chips to alternatively transmit signals to the correspondingly connected active signal lines and clock control signal lines, it may be possible to effectively eliminate the coupling capacitance inside the two driver chips to avoid the phenomenon of vertical white lines easily appearing on the screen position corresponding to the edge-most source connection lines. Accordingly, the display quality may be improved.

FIGS. 4-9 illustrate another exemplary display panel according to various disclosed embodiments of the present disclosure. As shown in FIGS. 4-9, the display panel may include a display area 10 and a non-display area 20. The non-display area 20 may at least partially surround the display area 10.

The display area 10 may include a plurality of data lines extending in the first direction Y. The non-display area 20 may include a plurality of source connection lines 201, a plurality of clock control signal lines 202, a plurality of active signal lines 203, a bonding area 204 and a multiplexer 205. The multiplexer 205 may be located between the display area 10 and the bonding area 204. The multiplexer 205 may be electrically connected to the first end of the source connection line 201 and the first end of the clock control signal line 202, respectively. The bonding area 204 may include two driver chips 206 oppositely disposed in the first direction Y. Each driver chip 206 may be electrically connected to the second ends of the plurality of source connection lines 201 and the second ends of the plurality of clock control signal lines 202. The active signal lines 203 may be distributed between the plurality of source connection lines 201 and the plurality of clock control signal lines 202.

The display panel also may include a plurality of first soldering pads 2031 and a plurality of second soldering pads 2021, which may be distributed in the bonding area 204 as shown in FIG. 1. One end of all active signal line 203 may be connected to a different first soldering pad 2031. Each driver chip 206 may be electrically connected to at least one first soldering pad 2031. Each clock control signal line 202 may be electrically connected to the driver chip 206 through a different second soldering pad 2021. The first soldering pad 2031 may meet one of the following conditions: as shown in FIGS. 4-8, at least one first target soldering pad in the first soldering pads 2031 and the second target soldering pad in the plurality of second soldering pads 2021 may be connected to the same driver chip 206. The minimum distance between the first target soldering pad and the second target soldering pad may be greater than the target size. The target size may be half the length of the driver chip 206 in the second direction X. The second direction X may be perpendicular to the first direction Y. As shown in FIG. 9, the number of the first soldering pads 2031 may be two, and the display panel may also include a first driving circuit 30 and a second driving circuit 40 that may be electrically connected to different first soldering pads 2031.

Through the above configuration, the display panel may send the second trigger signal to the two driver chips 206 such that the two driver chips 206 simultaneously output active signals to the correspondingly connected active signal lines 203, and simultaneously send the driving signals to the correspondingly connected active signal lines 203. By increasing the distance between the soldering pads of the active signal lines 203 and the soldering pads of the clock control signal lines 202, there may be no coupling capacitance inside the two driver chips 206. Because there may be no coupling capacitance, the phenomenon that vertical white lines are easily generated at the screen position corresponding to the edge-most source connection line 201 may be avoided, the display quality may be improved.

The above is the second core idea of the present disclosure. The technical solutions in the embodiments of the present disclosure will be clearly and completely described below in conjunction with the drawings in the embodiments of the present disclosure. Based on the embodiments in this disclosure, all other embodiments obtained by those of ordinary skill in the art without creative efforts fall within the scope of protection of this disclosure.

In the display panel of the above embodiment of the present disclosure, as shown in FIGS. 4-8, a plurality of first soldering pads 2031 and a plurality of second soldering pads 2021 may be distributed in the bonding area 204, and one end of each active signal line 203 may be connected to a different first soldering pad 2031, and each driver chip 206 may be electrically connected to at least one first soldering pad 2031. That is, one end of the active signal line 203 may be connected to the first soldering pad 2031, and the other end may also be connected to the first soldering pad 2031. At least one first soldering pad 2031 may be electrically connected to at least one driver chip 206, respectively. Each clock control signal line 202 may be electrically connected to the driver chip 206 through a different second soldering pad 2021. For example, one end of the clock control signal line 202 may be connected to a second soldering pad 2021, and the other end may also be connected to the second soldering pad 2021. The two second soldering pads 2021 may be electrically connected to the two driver chips 206, respectively.

Figure 4:
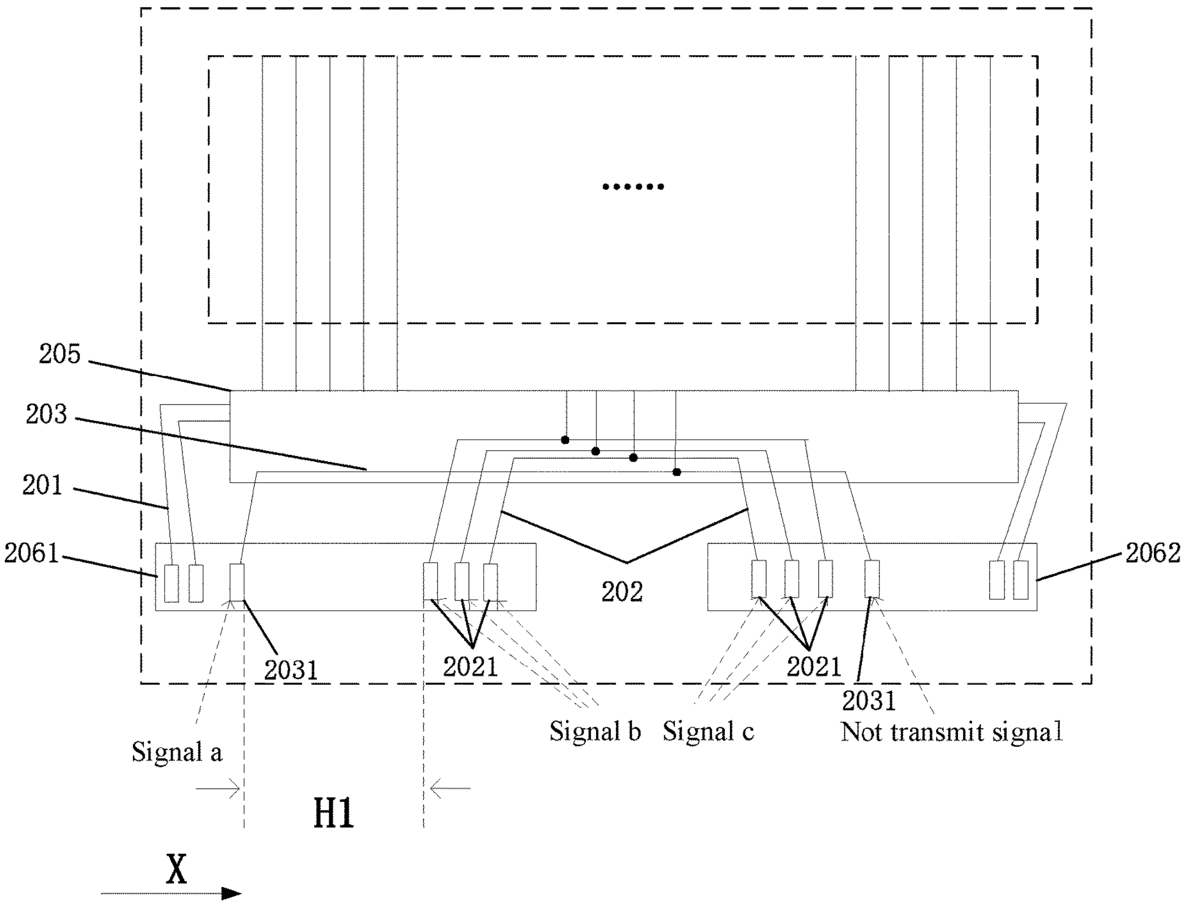
FIG. 4 illustrates a partial top view of another exemplary display panel according to various disclosed embodiments of the present disclosure.
Figure 5:
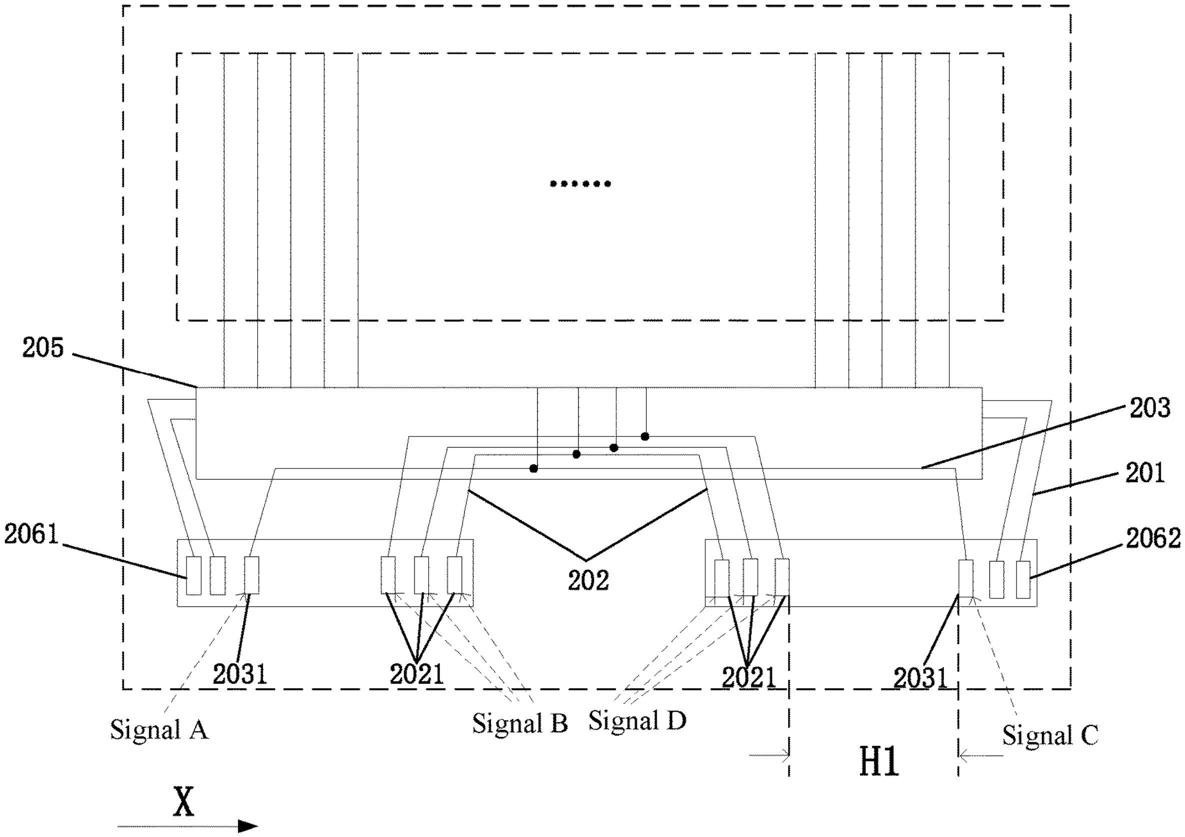
FIG. 5 illustrates a connection relationship between a control circuit and a driving chip of an exemplary display panel according to various disclosed embodiments of the present disclosure.

Specifically, as shown in FIGS. 4-5, for the first soldering pad 2031 and the second soldering pad 2021 electrically connected to the same driver chip, the minimum distance H1 between the two first soldering pad 2031 and the second soldering pad 2021 may be greater than half the length of the driver chip in the second direction X. Accordingly, by increasing the distance between the soldering pad of the active line 203 and the soldering pad of the clock control signal line 202, there may be no coupling capacitance inside the two driver chips. Because there may be no coupling capacitance inside the two driver chips, it may avoid the phenomenon that vertical white lines are easily generated at the screen position corresponding to the edge-most source connection line 201, and the display quality may be improved.

In one embodiment, as shown in FIG. 4, the first soldering pad 2031 in the display panel may be electrically connected to one end of the active signal line 203, and the active signal line 203 may be electrically connected to the first driver chip 2061 through the first soldering pad 2031. The active signal line 203 may be located among the plurality of source connection lines 201 and the plurality of clock control signal lines 202 that are electrically connected to the first driver chip 2061. The two driver chips may be the first driver chip 2061 and the second driver chip 2062, respectively. The minimum distance H1 between the first soldering pad 2031 and the second soldering pad 2021 that is electrically connected to the first driver chip 2061 may be greater than half the length of the first driver chip 2061 in the second direction X, and the minimum distance (not shown in the figure) between the first soldering pad 2031 and the second soldering pad 2021 electrically connected to the second driver chip 2062 may be greater than half the length of the second driver chip 2062 in the second direction X.

The driving method of the above two driver chips may be as follows: the first driver chip 2061 may send a signal a to the active signal line 203 through the correspondingly connected first soldering pad 2031, and may send a signal b to the clock control signal line 202 through the correspondingly connected second soldering pad 2021. At the same time, the second driver chip 2062 may send the signal c to the clock control signal line 202 through the correspondingly connected second bonding pad 2021, and may not send the signal to the active signal line 203 through the corresponding first soldering pad 2031. Through the above-mentioned driving method, sending signals to the active signal line 203 may be realized by the first soldering pads 2031 at one side. Through the above-mentioned implementation of single-sided signal sending, the distance between the soldering pads of the active signal line 203 and the clock control signal line 202 may be increased such that there may be no coupling capacitance inside the two driver chips, which may avoid the phenomenon of vertical white lines easily appearing on the screen position corresponding to the edge-most source connection lines; and the display quality may be improved.

It should be noted that, in addition to the above-mentioned first driver chip 2061 shown in FIG. 4 to realize the implementation of unilaterally sending signals to the active signal lines 203, the second driver chip may also be used to realize unilaterally sending signals to the active signal lines. The specific method may include: the second driver chip may send a signal to the active signal line through the corresponding first soldering pad, and may send a signal to the clock control signal line through the corresponding second soldering pad, while the first driver chip may send a signal to the clock control signal line through the corresponding second soldering pad, and does not send a signal to the active signal line through the corresponding first soldering pad.

In another embodiment, as shown in FIG. 5, the first soldering pad 2031 in the display panel may be electrically connected to one end of the active signal line 203, and the active signal line 203 may be electrically connected to the first driver chip through the first soldering pad 2031. The active signal line 203 may be located among the plurality of source connection lines 201 and the plurality of clock control signal lines 202 that are electrically connected to the first driver chip. The two driver chips may be the first driver chip 2061 and the second driver chip 2062. The minimum distance H1 between the first soldering pad 2031 and the second soldering pad 2021 that is electrically connected to the first driver chip 2061 may be greater than half the length of the first driver chip 2061 in the second direction X, and the minimum distance (not shown in the figure) between the first soldering pad 2031 and the second soldering pad 2021 electrically connected to the second driver chip 2062 may be greater than half the length of the second driver chip 2062 in the second direction X. The driving method of the above two driver chips may be as follows: the first driver chip 2061 may send signal A to the active signal line 203 through the corresponding first soldering pad 2031, and may send signal B to the clock control signal line 202 through the corresponding second soldering pad 2021. At the same time, the second driver chip 2062 may send the signal C to the active signal line 203 through the corresponding first soldering pad 2031, and may send the signal D to the clock control signal line 202 through the corresponding second soldering pad 2021. Through the above driving method, it may be realized that the first soldering pads 2031 on both sides send signals to the active signal lines 203, and the distance between the soldering pads of the active signal lines 203 and the soldering pads of the clock control signal lines 202 may be increased such that there may be no coupling capacitance inside the driver chips, which may avoid the phenomenon of vertical white lines easily appearing on the screen position corresponding to the edge-most source connection lines. Accordingly, the display quality may be improved.

Figure 6:
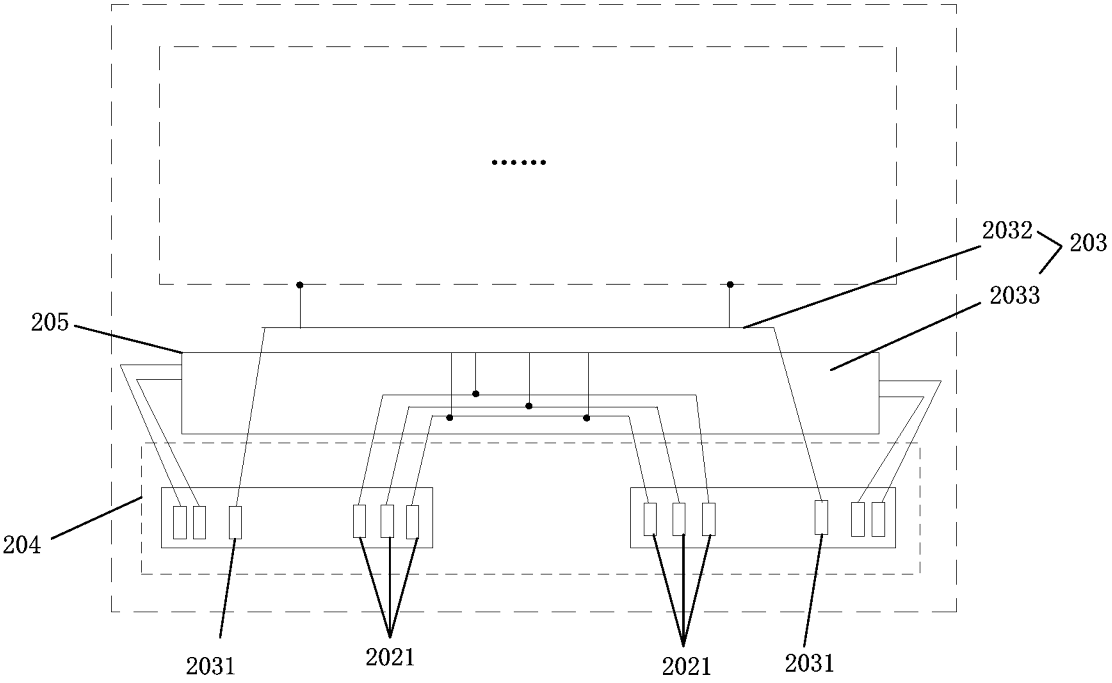
FIG. 6 illustrates a partial top view of another exemplary display panel according to various disclosed embodiments of the present disclosure.

In some embodiments, as shown in FIG. 6, each active signal line 203 may include a connected first line segment 2032 and a second line segment 2033, and the first line segment 2032 may include a first end of the active signal line 203. The first line segment 2032 may extend outside the bonding area 204. The second line segment 2033 may include a second end of the active signal line 203, and the second line segment 2033 may extend into the bonding area 204.

Illustratively, as shown in FIG. 6, each active signal line 203 may be divided into a first line segment 2032 and a second line segment 2033. The first line segment 2032 may be located outside the bonding area 204 and include the first end of the active signal line 203. The first line segment 2032 may be located within the bonding area 204 and may include the second end of the active signal line 203. The two driver chips may send signals to the active signal line through the first soldering pad 2031, and send a signal to the clock control signal line through the second soldering pad 2021.

Figure 7:
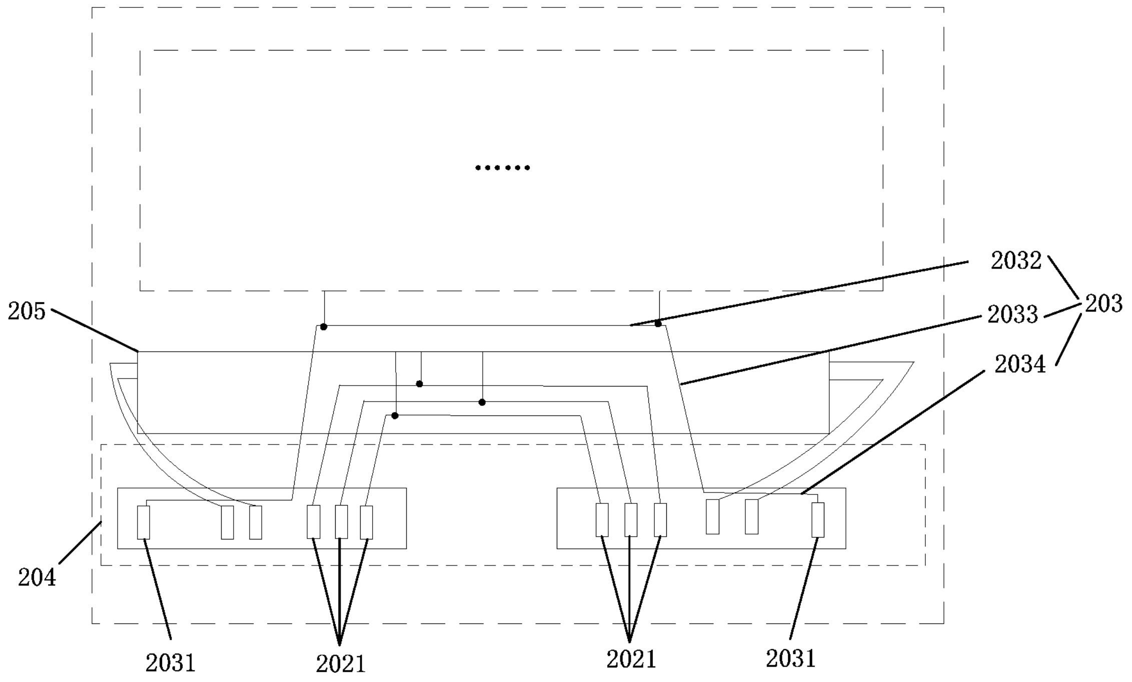
FIG. 7 illustrates a partial top view of another exemplary display panel according to various disclosed embodiments of the present disclosure.

In another embodiment, as shown in FIG. 7, each active signal line 203 may include a first line segment 2032, a second line segment 2033 and a third line segment 2034 connected in sequence. The first line segment 2032 may include a first end of the active signal line, and the first line segment 2032 may extend outside the bonding area 204. The second line segment 2033 may extend into the bonding area 204. The third line segment 2034 may include a second end of the active signal line, and the third line segment 2034 may extend in the bonding area 204.

In one embodiment, as shown in FIG. 7, each active signal line 203 may be divided into a first line segment 2032, a second line segment 2033 and a third line segment 2034. The first line segment 2032 may be located outside the bonding area 204, and may include the first end of the active signal line. The third line segment 2034 may be located in the bonding area 204, and may include the second end of the active signal line 203. The third line segment 2034 may be located in the two driver chips in the bonding area 204. The two driver chips may send signals to the active signal line 203 through the first soldering pad 2031, and may send signals to the clock control signal line through the second soldering pad 2021.

Figure 8:
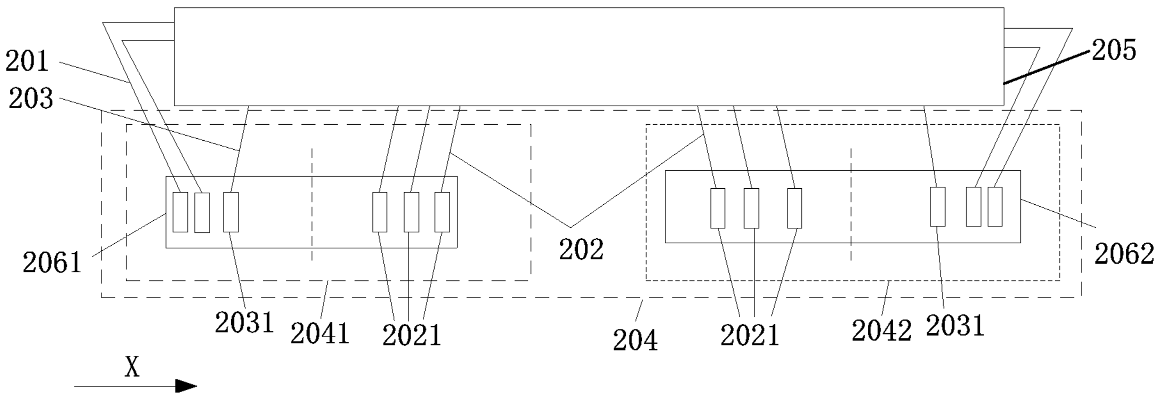
FIG. 8 illustrates a partial top view of another exemplary display panel according to various disclosed embodiments of the present disclosure.
Figure 9:
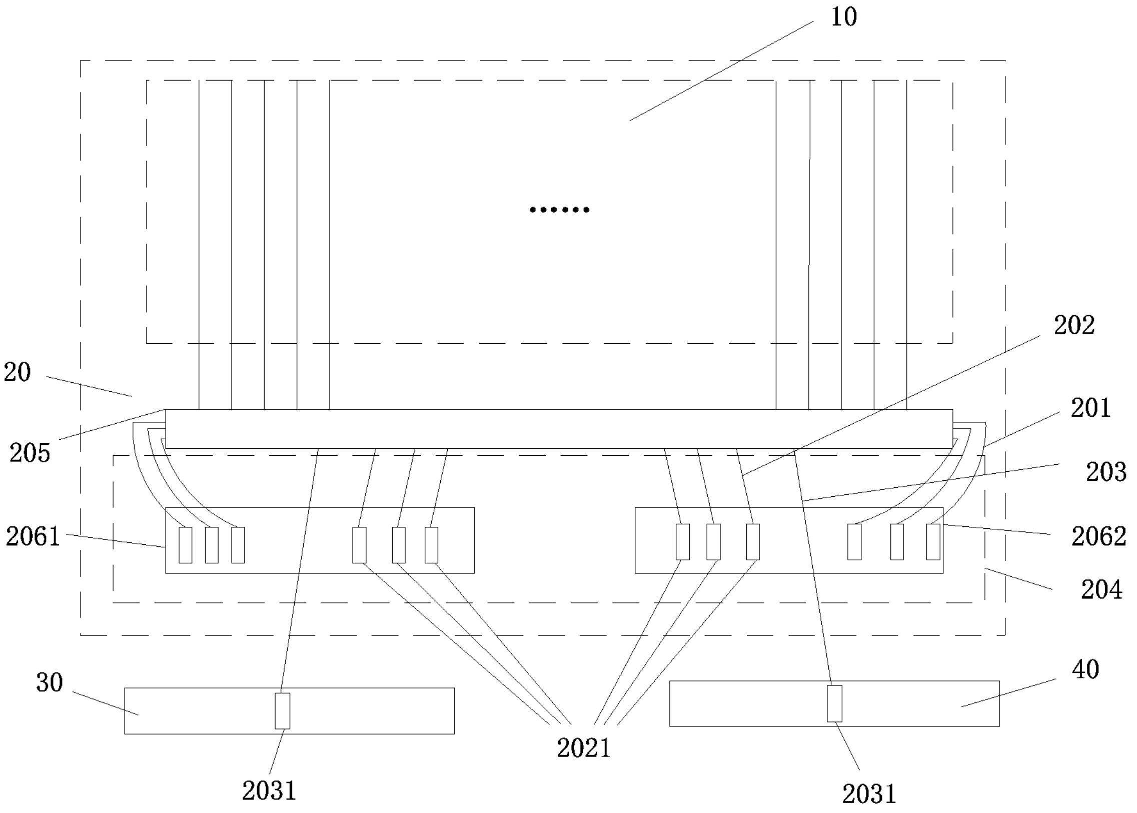
FIG. 9 illustrates a connection relationship between a control circuit and a driving chip of an exemplary display panel according to various disclosed embodiments of the present disclosure.

In some embodiments, as shown in FIG. 8, the bonding area 204 may include two sub-bonding areas oppositely distributed in the second direction X. The sub-bonding areas may correspond to the driver chips one-to-one. All second soldering pads 2021 may be located on the opposite inner sides of the two sub-binding areas.

Specifically, as shown in FIG. 8, the bonding area 204 may have two opposite sub-bonding areas in the second direction X. The first sub-bonding area 2041 may be provided with the first driver chip 2061. The second sub-bonding area 2042 may be provided with the second driver chip 2062. A portion of the second soldering pad 2021 may be located on a portion of the first driver chip 2061 adjacent to the second driver chip 2062, and another portion of the second soldering pad 2021 may be located on the second driver chip 2062 adjacent to the first driver chip 2061. A portion of the first driver chip 2061 may be located on the first driver chip 2061 away from the second driver chip 2062, and the other portion of the first soldering pad 2031 may be located on the second driver chip 2062 away from the first driver chip 2061. Using the above configuration, the distance between the first soldering pad 2031 connected to the active signal line 203 and the second soldering pad 2021 connected to the clock control signal line 202 on the same driver chip may be increased.

For example, as shown in FIG. 8, the bonding area 204 may include a first sub-bonding area 2041 and a second sub-bonding area 2042 oppositely distributed in the second direction. All the first soldering pads 2031 may be located in the opposite outer areas of the two sub-bonding areas, and all the second soldering pads 2021 may be located in the opposite inner areas of the two sub-bonding areas.

In some embodiments, as shown in FIG. 8, the plurality of source connection lines 201 and the plurality of clock control signal lines 202 electrically connected to each driver chip may be divided into two groups oppositely distributed in the second direction X. The active signal line 203 may be located between a group of source connection lines 201 and a group of clock control signal lines 202 that are electrically connected to the corresponding driver chip.

In the above embodiment, as shown in FIG. 8, the second soldering pad 2021 on the first driver chip 2061 may be electrically connected to the first group of clock control signal lines 202, and the first driver chip 2061 may be electrically connected to the first group of clock control signal lines 202, and the first group of source connection lines 201. The first group of source connection lines 201 and the first group of clock control signal lines 202 may be sequentially distributed in the second direction X. The first soldering pad 2031 on the first driver chip 2061 may be electrically connected to the active signal line 203 and may be located between the first group of source connection lines 201 and the first group of clock control signal lines 202. The active signal line 203 may be located on the side adjacent to the first group of source connection lines 201. The second soldering pad 2021 on the second driver chip 2062 may be electrically connected to a second group of clock control signal lines 202. The second driver chip 2062 may be electrically connected to a second group of source connection lines 201, and the second group of clock control signal lines 202 and the second group of source connection lines 201 may be sequentially distributed along the second direction X. The first soldering pad 2013 on the second driver chip 2062 may be electrically connected with the active signal line 203 and may be located tween the second group of source connection lines 201 and the second group of clock control signal lines 202. The active signal line 203 may be located on the side adjacent to the second group of source connection lines 201. Through the above arrangement, the distance between the first soldering pad 2031 of the active signal line 203 and the second soldering pad 2021 of the clock control signal line 202 that are electrically connected to the same drive chip may be increased such that there may be no internal coupling capacitance between the two driver chips. Accordingly, the phenomenon of vertical white lines easily appearing on the screen position corresponding to the edge-most source connection lines may be avoided, and the display quality may be improved.

In some embodiments, as shown in FIG. 9, there may be two first soldering pads 2031. The display panel in the embodiment of the present disclosure may include a first driving circuit 30 and a second driving circuit 40 electrically connected to different first soldering pads 2031.

Specifically, the first driving circuit 30 and the second driving circuit 40 may both be flexible printed circuits (FPC). The flexible circuit boards may be located outside the display area 10 and the non-display area 20. The flexible circuit boards may send signals through the first soldering pads 2031 such that the output elements of the active signal line 203 and the clock control signal line 202 may not interfere with each other, which may make the signal transmission effect better. Accordingly, the issue that the screen position corresponding to the edge-most source connection line 201 is easy to produce vertical white lines may be avoided, and the display quality may be improved.

In one embodiment, as shown in FIG. 9, the non-display area 20 may include a plurality of source connection lines 201, a plurality of clock control signal lines 202, a plurality of active signal lines 203, a bonding area 204 and a multiplexer 205. The active signal line 203 may be electrically connected to the second driver circuit 40 through the first soldering pad 2031. The active signal lines 203 may be located between the plurality of source connection lines 201 and the plurality of clock control signal lines 202 that are electrically connected to the first driver chip 2061, and between the plurality of source connection lines 201 and the plurality of clock control signal lines 202 electrically connected to the second driver chip 2062. The first driving circuit 30 and the second driving circuit 40 may be both flexible circuit boards, and may be located on the side of the non-display area 20 having the bonding area 204 away from the display area 10. The above-mentioned flexible circuit board may be any one of a single panel, an ordinary double panel, and a single panel generated from a substrate. Those skilled in the art can reasonably select the type of flexible circuit board, which is not specifically limited in this application.

The present disclosure also provides a control method of a display panel. The display panel may be a presently disclosed display panel. The display panel may include a first soldering pad and a second soldering pad. The method may include:

Step S102: sending a second trigger signal to two driver chips, such that at least one driver chip outputs an active signal to the correspondingly connected active signal line, and the two driver chips simultaneously output driving signals to the correspondingly connected clock control signal line.

In the above optional embodiment, when the display panel includes a first soldering pad and a second soldering pad, or when the display panel includes a first soldering pad, a first driving circuit and a second driving circuit, a second trigger signal may be sent to the two driver chips such that at least one driver chip may output an active signal to the correspondingly connected active signal line, and the two driver chips simultaneously output driving signals to the correspondingly connected clock control signal line. The method may increase the distance between the soldering pads of the active signal lines and the soldering pads of the clock control signal lines such that there may be no coupling capacitance inside the two driver chips. In both cases, there may be no coupling capacitances inside the two driver chips to avoid the tendency for vertical white lines to appear on the screen position corresponding to the edge-most source connection lines. Accordingly, the display quality may be improved.

In some embodiments, as shown in FIG. 4, when the display panel includes a first soldering pad 2031 and a second soldering pad 2021, the two driver chips may be a first driver chip 2061 and a second driver chip 2062, respectively. Sending the second trigger signal to the two driver chips may include: sending a first sub-trigger signal and the second sub-trigger signal to the first driver chip 2061, and simultaneously sending the third sub-trigger signal to the second driver chip 2062 such that the first driver chip 2061 may output an active signal to the correspondingly connected active signal line 203 according to the first sub-trigger signal, and output a driving signal to the clock control signal line 202 according to the second sub trigger-signal, while causing the second driver chip 2062 to output the driving signal to the clock control signal line 202 according to the third sub-trigger signal.

Specifically, as shown in FIG. 4, the first soldering pad 2031 in the display panel may be electrically connected to one end of the active signal line 203, and the active signal line 203 may be electrically connected to the first driver chip through the first soldering pad 2031. The active signal lines 203 may be located among a plurality of source connection lines 201 and a plurality of clock control signal lines 202 that are electrically connected to the first driver chip. The two driver chips may be the first driver chip 2061 and the second driver chip 2062, respectively. The minimum distance H1 between the first soldering pad 2031 and the second soldering pad 2021 electrically connected to first driver chip 2061 may be greater than half the length of the first driver chip 2061 along the second direction X, and the minimum distance (not shown in the figure) between the first soldering pad 2031 and the second soldering pad 2021 electrically connected to the second driver chip 2062 may be greater than half the length of the second driver chip 2062 in the second direction X. At this time, the step for sending the second trigger signal to the two driver chips may include: sending the first sub-trigger signal to the first driver chip 2061 such that the first driver chip 2061 may send the signal a to the active signal line 203 through the corresponding first soldering pad 2031, and sending a second sub-trigger signal through the first driver chip 2061 such that the second driver chip 2062 may send the signal b to the clock control signal line 202 through the corresponding second soldering pad 2021, and simultaneously sending a third sub-trigger signal to the second driver chip 2062 such that the second driver chip 2062 may send the signal c to the clock control signal line 202 through the corresponding second soldering pad 2021, and may not send the signal to the active signal line 203 through the corresponding first soldering pad 2031. Through the above driving method, the manner that the single-sided first soldering pad 2031 sends signals to the active signal line 203 may be achieved. Through the above-mentioned implementation of single-sided signal sending, the distance between the soldering pads of active signal lines and the soldering pads and clock control signal lines may be increased. Accordingly, there may be no coupling capacitance inside the two driver chips, which may avoid the phenomenon of vertical white lines easily appearing on the screen position corresponding to the edge-most source connection lines, and the display quality may be improved.

It should be noted that in addition to the above-mentioned implementation in which the first driver chip 2061 realizes unilateral transmission of signals to the active signal line 203, the second driver chip 2062 may also be used to realize unilateral transmission of signals to the active signal line 203. Specific methods may include: sending the first sub-trigger signal and the second sub-trigger signal to the second driver chip 2062, and simultaneously sending the third sub-trigger signal to the first driver chip 2061 such that the second driver chip 2062 may output the driving signal to the correspondingly connected active signal line 203 according to the first sub-trigger signal, and output a driving signal to the clock control signal line 202 according to the second sub-trigger signal, while causing the first driver chip 2061 to output a driving signal to the clock control signal line 202 according to the third sub-trigger signal.

In some other embodiments, as shown in FIG. 5, in the case where the display panel includes a first soldering pad 2031 and a second soldering pad 2021, the two driver chips may be the first driver chip 2061 and the second driver chip 2062 respectively. Sending the second trigger signal to the two driver chips may include: sending the first sub-trigger signal and the second sub-trigger signal to the first driver chip 2061, and simultaneously sending the third sub-trigger signal and the fourth sub-trigger signal to the second driver chip 2062 such that the first driver chip 2061 may output an active signal to the corresponding connected active signal line 203 according to the first trigger sub-signal, and output a driving signal to the corresponding connected clock control signal line 202 according to the second trigger sub-signal, and simultaneously causing the second driver chip 2062 to output an active signal to the correspondingly connected active signal line 203 according to the third trigger sub-signal, and the second driver chip 2062 to output the driving signal to the correspondingly connected clock control signal line 202 according to the fourth sub trigger-signal.

Specifically, as shown in FIG. 5, the first soldering pad 2031 in the display panel may be electrically connected to one end of the active signal line 203, the active signal line 203 may be electrically connected to the first driver chip through the first soldering pad 2031. The active signal lines 203 may be located between a plurality of source connection lines 201 and a plurality of clock control signal lines 202 that are electrically the first driving chip. The two driver chips may be the first driver chip 2061 and the second driver chip 2062, respectively. The first driver chip 2061 may be electrically connected to the second driver chip 2062. The minimum distance H1 between the first soldering pad 2031 and the second soldering pad 2021 electrically connected to the first driver chip 2061 may be greater than half the length of the first driver chip 2061 in the second direction X. The minimum distance (not shown in the figure) between the first soldering pad 2031 and the second soldering pad 2021 may be greater than half the length of the second driver chip 2062 in the second direction X. At this time, the method for sending the second triggering signal to the two driver chips may include: sending the first sub-trigger signal to the first driver chip 2061 such that the first driver chip 2061 may send the signal A to the active signal line 203 through the corresponding first pad 2031, and sending the second sub-trigger signal to the first driving chip 2061 such that the first driver chip 2061 may send the signal B to the clock control signal line 202 through the corresponding second soldering pad 2021, and at the same time may send the third trigger sub-signal to the second driver chip 2062 to cause the second driver chip 2062 to send the signal C to the active signal line 203 through the corresponding first soldering pad 2031, and sending the fourth sub-trigger signal to the second driving chip 2062 such that the second driver chip 2062 may send the signal D to the clock control signal line 202 through the corresponding second soldering pad 2021. Through the above driving method, the manner that that the first soldering pads 2031 at both sides may send signals to the active signal lines 203 may be realized, and the distance between the soldering pads of the active signal line 203 and the soldering pads of the clock control signal line 202 may be realized. Accordingly, there may be no coupling capacitance inside the driver chips, which may avoid the phenomenon of vertical white lines easily appearing on the screen position corresponding to the edge-most source connection lines, and the display quality may be improved.

Figure 10:
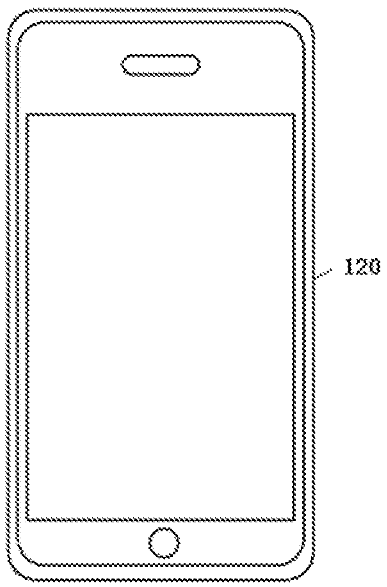
FIG. 10 illustrates an exemplary display device according to various disclosed embodiments of the present disclosure.

The present disclosure also provides a display device. The display device may include a presently disclosed display panel. FIG. 10 illustrates an exemplary display device according to various disclosed embodiments of the present disclosure.

As shown in FIG. 10, in one embodiment, the display device 120 may be a mobile phone. The above-mentioned display device may also be any electronic products with a display function, including but not limited to notebook computers, tablet computers, digital cameras, televisions, desktop monitors, smart bracelets, smart glasses, vehicle monitors, industrial control equipment, medical displays, or touch interactive terminals, etc., which are not specifically limited in the embodiments of this disclosure.

It should also be noted that the terms "comprises", "includes", or any other variation thereof are intended to cover a non-exclusive inclusion, such that a process, method, article, or apparatus that includes a list of elements not only includes those elements, but also includes other elements are not expressly listed or are inherent to the process, method, article or equipment. Without further limitation, an element qualified by the statement "comprises a . . . " does not exclude the presence of additional identical elements in the process, method, good, or device that includes the element.

The above are only examples of the present disclosure and are not used to limit the present disclosure. To those skilled in the art, various modifications and variations may be made to this disclosure. Any modifications, equivalent substitutions, improvements, etc. made within the spirit and principles of this disclosure shall be included in the scope of the claims of this disclosure.

What is claimed is:

1. A display panel, comprising:

a display area;

a non-display area at least partially surrounding the display area; and a control circuit, or a plurality of first soldering pads and a plurality of second soldering pads, wherein:

the display area includes a plurality of data lines extending in a first direction;

the non-display area includes a plurality of source connection lines, a plurality of clock control signal lines, a plurality of active signal lines, a bonding area and a multiplexer located between the display area and the bonding area, the multiplexer is electrically connected to a first end of a source level connection line of the plurality of source connection lines and a first end of a clock control signal line of the plurality of clock control signal lines respectively, the bonding area includes two driver chips arranged oppositely in the first direction, each of the two driver chips is electrically connected to second ends of the plurality of source connection lines and second ends of the plurality of clock control signal lines, and the plurality of active signal lines are distributed between the plurality of the source connection lines and the plurality of the clock control signal lines;

the control circuit is electrically connected to the two driver chips, and configured to control the two driver chips not to output active signals to correspondingly connected active signal lines of the plurality of active signal lines at the same time and not to output driving signals to correspondingly connected clock control signal lines of the plurality of clock control signal lines, and each of the two driver chips is electrically connected to at least one of the plurality of active signal lines; and the plurality of first soldering pads and the plurality of second soldering pads are distributed in the bonding area, one end of each active signal line of the plurality of active signal lines is connected to a different first soldering pad of the plurality of first soldering pads, each of two driver chips is electrically connected to at least one of the plurality of first soldering pads, each of the plurality of clock control signal lines is electrically connected to the driver chip through a different second soldering pad of the plurality of second soldering pads, and the first soldering pad meets one of the following conditions: at least one first target soldering pad among the plurality of first soldering pads and a second target soldering pad among the plurality of second soldering pads are connected to a same driver chip of the two driver chips, a minimum distance between the second target soldering pad and the first target soldering pad is greater than a target size, the target size is half a length of the driver chip in the second direction, the second direction is perpendicular to the first direction, and when a number of the plurality of first pads is two, the display panel further includes a first driving circuit and a second driving circuit electrically connected to different first soldering pads of the plurality of first soldering pads.

2. The display panel according to claim 1, wherein:

the display panel includes the control circuit;

the control circuit includes a transmission module configured to alternatively transmit a first signal and a second signal; and the two driver chips are a first driving chip and a second driver chip, respectively, wherein:

the first driver chip includes a first receiving module and a first driving module, the first receiving module is electrically connected to the transmission module, the first driving module is electrically connected to the first receiving module, the clock control signal line and the active signal line, and configured to output an active signal to a correspondingly connected active signal line when the first receiving module receives the first control signal, and output a driving signal to a correspondingly connected clock control signal line when the first receiving module receives the second control signal; and the second driver chip includes a second receiving module and a second driving module, the second receiving module is electrically connected to the transmission module, the second driving module is respectively connected to the second receiving module, the clock control signal line and the active signal line, and is configured to output a driving signal to the correspondingly connected clock control signal line when the second receiving module receives the first control signal, and output an active signal to the correspondingly connected active signal line when the second receiving module receives the second control signal.

3. The display panel according to claim 1, wherein:

the two driver chips are a first driver chip and a second driver chip, respectively;

the active signal line electrically connected to the first driver chip through the first soldering pad is located between the plurality of source connection lines and the plurality of clock control signal lines; and the active signal line electrically connected to the second driver chip through the first soldering pad is located between the plurality of source connection lines and the plurality of clock control signal lines.

4. The display panel according to claim 3, wherein:

each of the plurality of active signal lines includes a first line segment and a second line segment that are connected to each other;

the first line segment includes a first end of the active signal line and extends to the outside of the bonding area; and the second line segment includes a second end of the active signal line and extends into the bonding area.

5. The display panel according to claim 3, wherein:

each of the plurality of active signal lines includes a first line segment, a second line segment and a third line segment connected in sequence;

the first line segment includes a first end of the active signal line and extends outside the bonding area;

the second line segment extends into the bonding area; and the third line segment includes a second end of the active signal line and extends inside the bonding area.

6. The display panel according to claim 3, wherein:

the bonding area includes two sub-bonding areas oppositely distributed in the first direction;

the sub-bonding areas correspond to the two driver chips one-to-one; and each of the plurality of second soldering pads is located on opposite inner sides of the two sub-bonding areas.

7. The display panel according to claim 6, wherein:

each of the plurality of second soldering pads is located on the opposite inner sides of the two sub-bonding areas.

8. The display panel according to claim 6, wherein:

the plurality of source connection lines and the plurality of clock control signal lines are all divided into two groups oppositely distributed in the first direction; and the clock control signal lines of each group are located between the two groups of source connection lines.

9. The display panel according to claim 1, wherein:

both the first driver circuit and the second driver circuit are flexible circuit boards; and the flexible circuit boards are located outside the display area and the non-display area.

10. A control method of a display panel, comprising:

providing a display panel, wherein the display panel includes:

a display area;

a non-display area at least partially surrounding the display area; and a control circuit, or a plurality of first soldering pads and a plurality of second soldering pads, wherein:

the display area includes a plurality of data lines extending in a first direction;

the non-display area includes a plurality of source connection lines, a plurality of clock control signal lines, a plurality of active signal lines, a bonding area and a multiplexer located between the display area and the bonding area, the multiplexer is electrically connected to a first end of a source level connection line of the plurality of source connection lines and a first end of a clock control signal line of the plurality of clock control signal lines respectively, the bonding area includes two driver chips arranged oppositely in the first direction, each of the two driver chips is electrically connected to second ends of the plurality of source connection lines and second ends of the plurality of clock control signal lines, and the plurality of active signal lines are distributed between the plurality of the source connection lines and the plurality of the clock control signal lines;

the control circuit is electrically connected to the two driver chips, and configured to control the two driver chips not to output active signals to correspondingly connected active signal lines of the plurality of active signal lines at the same time and not to output driving signals to correspondingly connected clock control signal lines of the plurality of clock control signal lines, and each of the two driver chips is electrically connected to at least one of the plurality of active signal lines; and the plurality of first soldering pads and the plurality of second soldering pads are distributed in the bonding area, one end of each active signal line of the plurality of active signal lines is connected to a different first soldering pad of the plurality of first soldering pads, each of two driver chips is electrically connected to at least one of the plurality of first soldering pads, each of the plurality of clock control signal lines is electrically connected to the driver chip through a different second soldering pad of the plurality of second soldering pads, and the first soldering pad meets one of the following conditions: at least one first target soldering pad among the plurality of first soldering pads and a second target soldering pad among the plurality of second soldering pads are connected to a same driver chip of the two driver chips, a minimum distance between the second target soldering pad and the first target soldering pad is greater than a target size, the target size is half a length of the driver chip in the second direction, the second direction is perpendicular to the first direction, and when a number of the plurality of first pads is two, the display panel further includes a first driving circuit and a second driving circuit electrically connected to different first soldering pads of the plurality of first soldering pads;

when the display panel includes the control circuit, sending a first trigger signal to the control circuit to control the two driver chips in the display panel not to send output active signals to the corresponding connected active control signal lines at the same time and not to output driving signals to the correspondingly connected clock control signal lines, wherein both ends of the active signal line are electrically connected to different driver chips respectively; or when the display panel includes the first bonding pad and the second bonding pad; or when the display panel includes the first bonding pad, a first driving circuit and a second driving circuit, sending a second trigger signal to the two driver chips such that at least one of the two driver chips outputs an active signal to the correspondingly connected active signal line, and the two driver chips simultaneously output a driving signal to the correspondingly connected clock control signal line.

11. The method according to claim 10, wherein the display panel includes the first bonding pad and the second bonding pad, the two driver chips are respectively a first driving chip and a second driver chip, sending the second trigger signal to the two driver chips comprises:

sending a first sub-trigger signal and a second sub-trigger signal to the first driver chip, and simultaneously sending a third sub-trigger signal to the second driver chip such that the first driver chip outputs the active signal to the correspondingly connected active signal line in response to the first sub-trigger signal and outputs the driving signal to the correspondingly connected clock control signal line according to the second sub-trigger signal, and at the same time to cause the second driver chip to output the driving signal to the correspondingly connected clock control signal according to the third sub-trigger signal; or sending a first sub-trigger signal and a second sub-trigger signal to the second driver chip, and simultaneously sending a third sub-trigger signal to the first driver chip such that the second driver chip outputs the active signal to the correspondingly connected active signal line according to the first sub-trigger signal, and outputs the driving signal to the correspondingly connected clock control signal line according to the second sub-trigger signal, while causing the first driver chip to output the driving signal to the corresponding connected clock control signal line according to the third sub-trigger signal; or sending a first sub-trigger signal and a second sub-trigger signal to the first driver chip, and simultaneously sending a third sub-trigger signal and a fourth sub-trigger signal to the second driver chip such that the first driver chip outputs the active signal to the correspondingly connected active signal line according to the first sub-trigger signal, and outputs the driving signal to the correspondingly connected clock control signal line according to the second sub-trigger signal, while causing the second driver chip to output the active signal according to the second sub-trigger signal, and at the same time cause the second driver chip to output the active signal to the corresponding connected active signal line according to the third sub-trigger signal, and the second driver chip to output the driving signal to the corresponding connected clock control signal line according to the fourth sub-trigger signal.

12. A display device, comprising:

a display panel, including:

a display area;

a non-display area at least partially surrounding the display area; and a control circuit, or a plurality of first soldering pads and a plurality of second soldering pads, wherein:

the display area includes a plurality of data lines extending in a first direction;

the non-display area includes a plurality of source connection lines, a plurality of clock control signal lines, a plurality of active signal lines, a bonding area and a multiplexer located between the display area and the bonding area, the multiplexer is electrically connected to a first end of a source level connection line of the plurality of source connection lines and a first end of a clock control signal line of the plurality of clock control signal lines respectively, the bonding area includes two driver chips arranged oppositely in the first direction, each of the two driver chips is electrically connected to second ends of the plurality of source connection lines and second ends of the plurality of clock control signal lines, and the plurality of active signal lines are distributed between the plurality of the source connection lines and the plurality of the clock control signal lines;

the control circuit is electrically connected to the two driver chips, and configured to control the two driver chips not to output active signals to correspondingly connected active signal lines of the plurality of active signal lines at the same time and not to output driving signals to correspondingly connected clock control signal lines of the plurality of clock control signal lines, and each of the two driver chips is electrically connected to at least one of the plurality of active signal lines; and the plurality of first soldering pads and the plurality of second soldering pads are distributed in the bonding area, one end of each active signal line of the plurality of active signal lines is connected to a different first soldering pad of the plurality of first soldering pads, each of two driver chips is electrically connected to at least one of the plurality of first soldering pads, each of the plurality of clock control signal lines is electrically connected to the driver chip through a different second soldering pad of the plurality of second soldering pads, and the first soldering pad meets one of the following conditions: at least one first target soldering pad among the plurality of first soldering pads and a second target soldering pad among the plurality of second soldering pads are connected to a same driver chip of the two driver chips, a minimum distance between the second target soldering pad and the first target soldering pad is greater than a target size, the target size is half a length of the driver chip in the second direction, the second direction is perpendicular to the first direction, and when a number of the plurality of first pads is two, the display panel further includes a first driving circuit and a second driving circuit electrically connected to different first soldering pads of the plurality of first soldering pads.

* * * * *